United States Patent
Jordan et al.

(10) Patent No.: US 8,869,949 B2
(45) Date of Patent: Oct. 28, 2014

(54) RIM BRAKE

(75) Inventors: Brian T. Jordan, Chicago, IL (US);
Andreas Vonend, Waigolshausen (DE);
Andreas Guender, Ramsthal (DE)

(73) Assignee: SRAM, LLC, Chicago, IL (US)

( * ) Notice: Subject to any disclaimer, the term of this patent is extended or adjusted under 35 U.S.C. 154(b) by 196 days.

(21) Appl. No.: 13/532,894

(22) Filed: Jun. 26, 2012

(65) Prior Publication Data

US 2013/0341128 A1 Dec. 26, 2013

(51) Int. Cl.
*B62L 1/02* (2006.01)
*B62L 3/00* (2006.01)

(52) U.S. Cl.
CPC .......................................... *B26L 1/12* (2013.01)
USPC ...................... 188/24.22; 188/24.12

(58) Field of Classification Search
CPC .............. B62L 1/02; B62L 1/06; B62L 1/10; B62L 1/12; B62L 3/02; B62L 3/023
USPC .................... 188/24.11–24.22, 344
See application file for complete search history.

(56) References Cited

U.S. PATENT DOCUMENTS

| 3,338,337 | A | | 8/1967 | Freeland | |
|---|---|---|---|---|---|
| 3,628,635 | A | | 12/1971 | Yoshigai | |
| 3,889,057 | A | | 8/1975 | Carre | |
| 3,899,057 | A | * | 8/1975 | Carre | 188/351 |
| 4,632,225 | A | * | 12/1986 | Mathauser | 188/24.18 |
| 4,852,698 | A | | 8/1989 | Nagano | |
| 5,188,200 | A | * | 2/1993 | Modolo | 188/24.11 |
| 5,425,434 | A | | 6/1995 | Romano | |
| 8,336,680 | B2 | * | 12/2012 | Nago | 188/24.12 |
| 2009/0038894 | A1 | | 2/2009 | Liu | |
| 2011/0290595 | A1 | * | 12/2011 | Nago | 188/24.22 |

FOREIGN PATENT DOCUMENTS

| DE | 3303586 | 8/1984 |
|---|---|---|
| DE | 3325970 | 1/1985 |
| DE | 29924519 | 8/2003 |
| EP | 0166905 | 1/1986 |
| EP | 0575720 | 12/1993 |
| EP | 2275335 | 1/2011 |
| EP | 2424310 | 2/2012 |
| EP | 2591959 | 5/2013 |
| IT | 1224661 | 10/1990 |
| JP | 54108327 | 8/1979 |
| JP | 2011143764 | 7/2011 |

* cited by examiner

*Primary Examiner* — Vishal Sahni
(74) *Attorney, Agent, or Firm* — Milan Milosevic; Lisa Serdynski; Steven Courtright

(57) ABSTRACT

A rim brake with a synchronous link mechanism for synchronizing the movement of a pair of brake arms. The rim brake may be a hydraulic rim brake. The hydraulic rim brake may include a slave cylinder formed in one of the pair of brake arms including a piston, wherein the piston contacts the other of the pair of brake arms to impart movement thereto.

38 Claims, 5 Drawing Sheets

RIM BRAKE

BACKGROUND OF THE INVENTION

The invention relates to brake systems, and more particularly, to a rim brake, as for a bicycle.

Bicycles typically employ one of three different kinds of brakes. The relative popularity of these brakes is based mainly on the type of bicycle to which they are affixed. Urban bikes usually use internal gear hubs with a coaster brake in the rear wheel and a rim brake at the front wheel. Mountain bikes typically have disc brakes, and road and triathlon style bikes typically have rim brakes because rim brakes are lightweight and aerodynamic.

There are two different popular kinds of rim brakes on the market. A first is a two post brake and a second is a single pivot brake. The two post brake usually has a gear connection between the left and the second arms, which connects both arms and reduces the apparatus to one degree of freedom. A disadvantage of a two post brake is the different pad path of each brake arm. This kind of brake is also heavier than a single pivot brake because it has more components and every component needs to be of high strength in order to deal with high brake loads. The only disadvantage of the single pivot brake is the asymmetric pad movement caused by different friction experienced by each arm and the asymmetric side load from the cable. These brakes have two degrees of freedom and a spring for each arm to push each arm back to the outer positions. If a higher side load than the preload of the spring is exerted upon one arm, the brake pad attached to that arm would touch the rim all of the time.

The invention provides a bicycle with a rim brake that is not heavy or complex and has suitable performance characteristics.

BRIEF SUMMARY OF THE INVENTION

In light of the present need for an improved brake apparatus, and in particular an apparatus that is provided in an overall ergonomic package, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections, but it should be understood that minor variations of these concepts are contemplated by the invention.

The invention seeks to cancel this only disadvantage of the single pivot brake and ensures that both brake pads move synchronously. In prior art devices, because there is not always the same friction in each connection of the brake arms, one arm tends to move until it touches the rim and then the other pad moves. The synchronal link mechanism according to the invention ensures that both pads move the same distance at the same time. This invention improves the operation and the comfort of a single pivot brake which can be easily installed with one bolt on the fork or on the frame, is very small, lightweight, and easy to adjust. The invention reduces the degree of freedom of the rim brake to one and both arms are operatively connected to each other and move synchronously. In one embodiment, the synchronal link is provided to a novel hydraulic brake apparatus.

One aspect of the invention provides a brake assembly for a bicycle including a first brake arm and a second brake arm pivotally disposed on a single pivot. A ground body is disposed on the pivot and releasably securable thereto, the ground body including a link pivot. A link member is pivotally disposed on the link pivot, the link member having a first end contacting the first brake arm and a second end contacting the second brake arm and arranged so as to synchronize the motion of the first brake and a spring bears against one or both of the first and second brake arms and biases the first and second brake arms into a rest position.

Another aspect of the invention provides a hydraulic rim brake for a bicycle, the bicycle including a master cylinder, the hydraulic rim brake including a first brake arm and a second brake arm, the first and second brake arms pivotally connected to the bicycle. A slave cylinder is disposed in one of the first and second brake arms and in fluid communication with the master cylinder, the slave cylinder including a piston positioned to act upon the other of the first and second brake arms, such that movement of the piston in response to fluid displacement in the master cylinder causes the first brake arm and the second brake arm to pivot.

Yet another aspect of the invention provides a brake assembly for a bicycle including a first brake arm and a second brake arm pivotally disposed on a single pivot. An adjustable ground body is disposed on the pivot and releasably securable thereto in a plurality of positions, the ground body including a link pivot. A synchronous link mechanism including a link member is pivotally disposed on the link pivot and interconnecting the ground body and the first and second brake arms and arranged so as to synchronize the motion of the first and second brake arms and a spring biases the first and second brake arms into a rest position.

These and other features and advantages of the present invention will be more fully understood from the following description of one or more embodiments of the invention, taken together with the accompanying drawings.

BRIEF DESCRIPTION OF THE SEVERAL VIEWS OF THE DRAWINGS

FIGS. 2A and B is a rear view of a rim brake according to an embodiment of the invention, wherein FIG. 2A shows a spring biased against one brake arm and FIG. 2B shows a spring biased against both brake arms;

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "upper" and "lower" or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
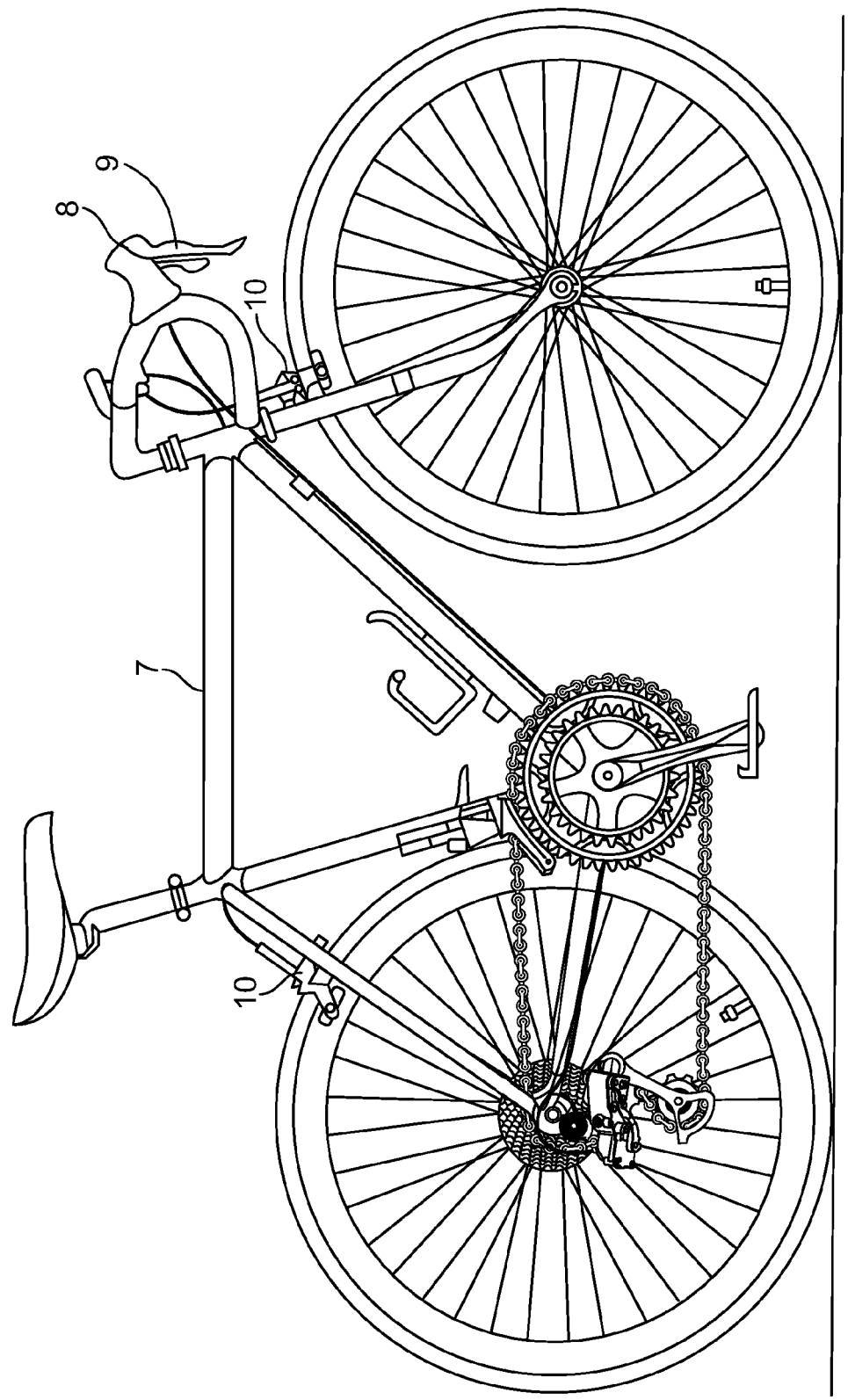
FIG. 1 is a side view of a bicycle with a rim brake.

FIGS. 1-7 show a rim brake assembly or rim brake caliper 10 in various views and in relatively opened and closed positions. FIG. 1 shows the rim brake assembly 10 on a bicycle frame 7 and operable with an actuator, such as a lever 9 of a brake control apparatus 8. It will be understood that some embodiments of the invention contemplate both hydraulic and non-hydraulic brake assemblies.

Turning to FIGS. 2-7, the rim brake assembly 10 includes a pivot 11, a first brake arm 12 (shown on the left of the figures), a second brake arm 13 (shown on the right of the figures), a ground body 14, a link member 15, a slave piston 16, a hydraulic connection 113, and a return spring 17. The second brake arm 13 and the first brake arm 12 carry the brake pads 116 and pivot around pivot 11.

The pivot 11, which may be a bolt, mounts the ground body 14 and brake arms 12, 13 to a bicycle frame 7. The pivot 11 is fixed to the frame 7 between center nut 31 on the brake arms side of the frame and pivot bolt 32 on the side of the frame opposite the brake arms. The ground body 14 is spaced from the frame 7 by center nut 31. The first and second brake arms 12, 13 mount pivotally on the pivot 11, outboard of the ground body 14. The ground body 14 is releasably securable with respect to the pivot 11.

There is a bore 22 in the second brake arm 13 in which the slave piston 16 is disposed and reciprocates therein to form a slave cylinder 115. The slave cylinder 115 is in fluid communication with bleed port 112 and hydraulic connection 113. The hydraulic connection 113 may be a conventional banjo fitting or any suitable connection.

It will be understood that the structure related to the hydraulic operation of the illustrated brake assembly is for one embodiment of the invention. The link member 15 and associated structure may be used with cable-operated brakes as well as hydraulically-operated brakes with equal efficacy, and without substantial modification. Both cable-operated brakes and hydraulic brakes are well-known. The illustrated hydraulically-operated brake, however has several novel features and is particularly well-suited to modern bicycles such as, for example, "time-trial" and "triathlon" type bicycles, in addition to other types of bicycles.

The outer side of the slave piston 16 contacts the curved surface 114 of the first brake arm 12 to form a cam follower connection. This cam follower connection forms a force path between the first brake arm 12, the slave piston 16, and the second brake arm 13 to permit the brake pads 116 to move relatively in and out with respect to each other. The ground body 14 may be clamped to the pivot 11 with the clamping screw 110 and may carry the spring 17 and the link pivot 111. Other means of securing the ground body 14 to the pivot 11 and/or relative to the frame 7 is contemplated by the invention.

The slave cylinder 115 is connected to a master cylinder of a hydraulic brake control apparatus 8 as is well known, and operated with a hand lever 9. When an increase in pressure is generated in the master cylinder by the hand lever 9, the oil pressure in the master cylinder, the hydraulic line and the slave cylinder 115 increases and the slave piston 16 moves upwards (i.e., outwardly from the bore 22 of cylinder 115). The slave piston 16 pushes, in the illustrated embodiment, directly against the curved surface 114 of the first brake arm 12 and causes both brake arms and both brake pads 116 to move towards each other. Alternatively, the piston 16 may have an outer surface 30 that is curved and the surface 114 of the arm 12 may be flat. Further, both the piston surface 30 and surface 114 may have other shapes that permit them to cooperate.

Figure 2A:
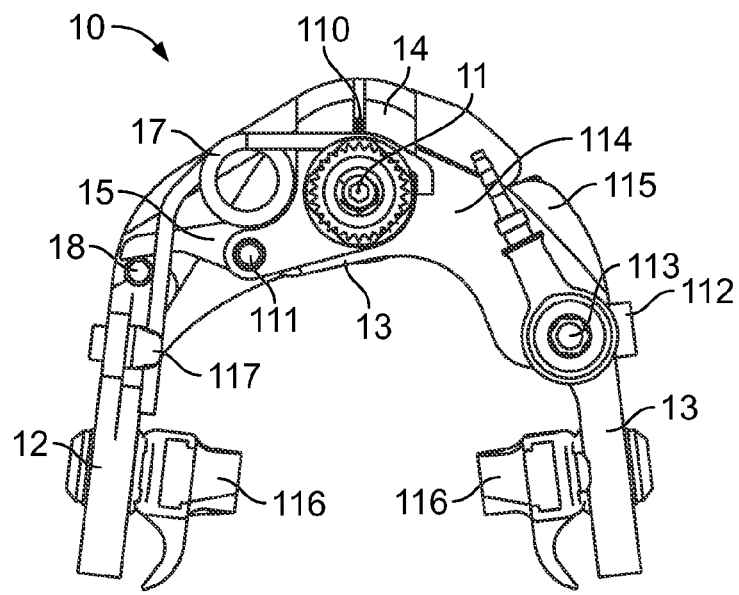
Figure 2B:
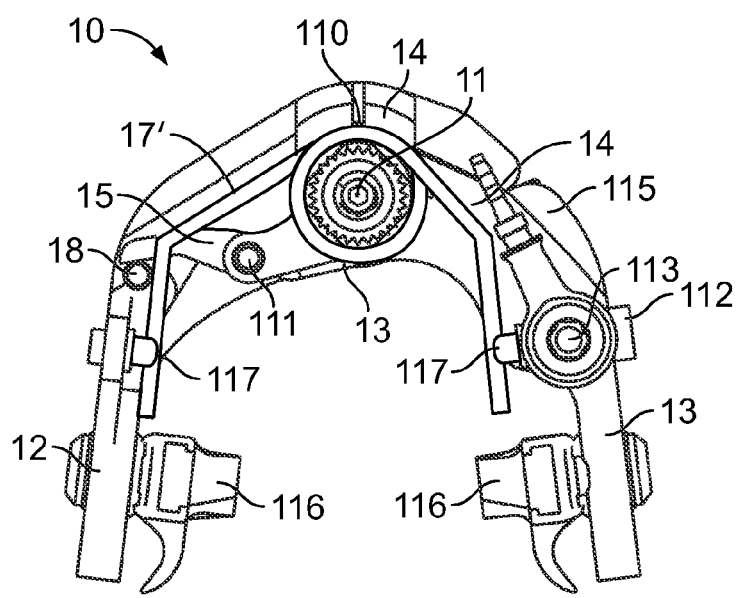
Figure 3:
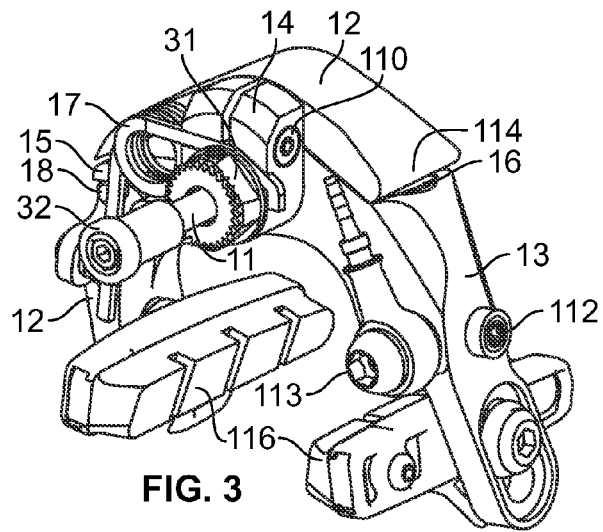
FIG. 3 is a upper rear perspective view of the rim brake of FIG. 2.
Figure 4:
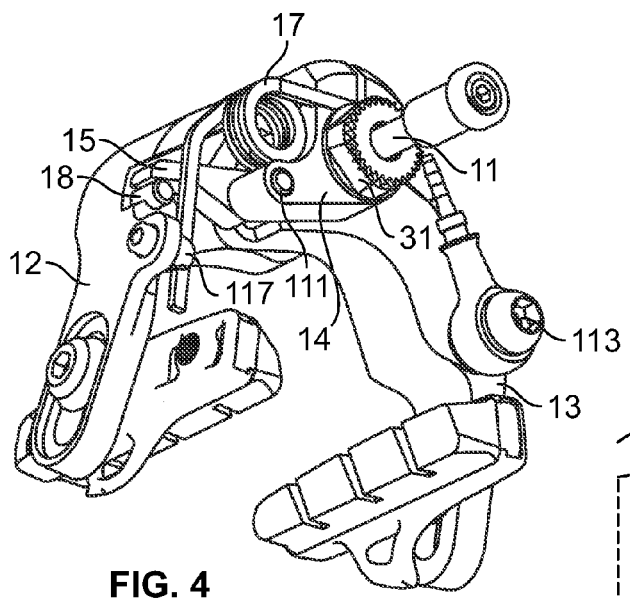
FIG. 4 is a lower rear perspective view of the rim brake of FIG. 2.
Figure 5:
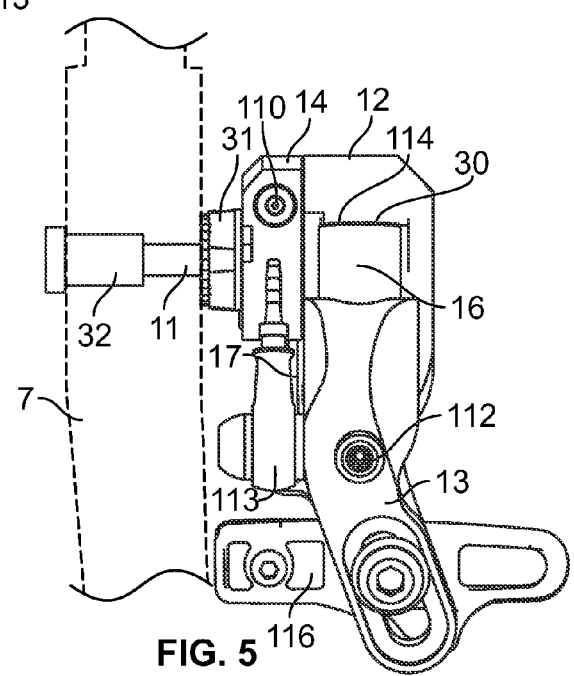
FIG. 5 is a right side view of the rim brake of FIG. 2.
Figure 6:
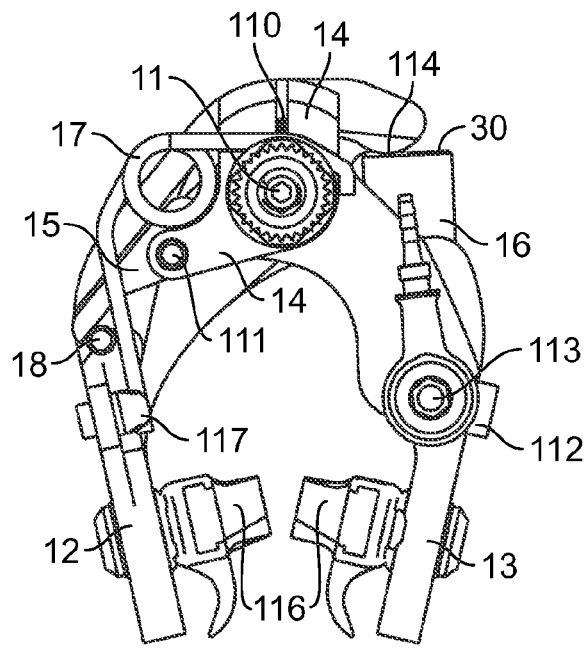
FIG. 6 is a rear view of the rim brake of FIG. 2 with the arms in a closed condition.

The link pivot 111 forms the pivot of the link member 15. The link pivot may be a pin, protrusion, post or any suitable structure that can carry the link member 15 and permit pivoting thereof. The spring 17 may be clamped to the ground body 14 at or near one end and has an opposite end that is slidably received by bracket 117, which is connected to the first brake arm 12 and loads the first brake arm to urge the rim brake assembly 10 to return to the open or rest position shown in FIG. 7. In an alternative, as shown in FIG. 2B, the spring 17' may be biased against both brake arms 12, 13.

Figure 7:
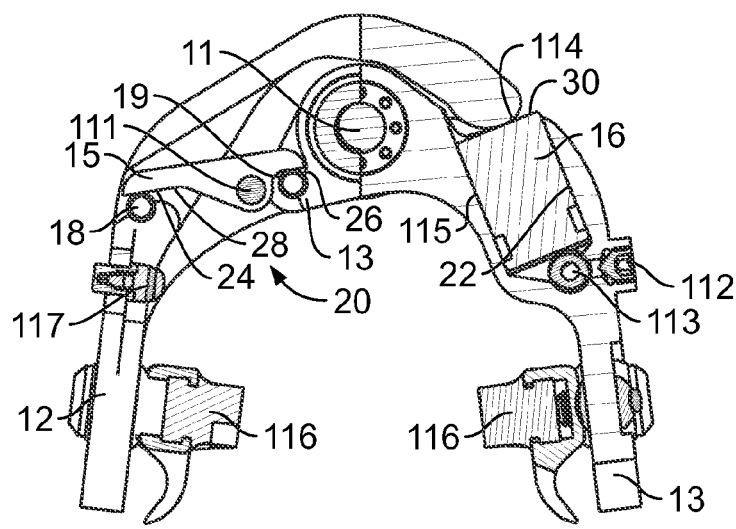
FIG. 7 is a rear view of the rim brake of FIG. 2 with the arms in an open condition with one arm shown in cross section.

FIG. 7 shows a detailed view of the synchronal link mechanism 20 by omitting the spring 17 and the ground body 14. Both the second brake arm 13 and the first brake arm 12 are operatively connected to each other through the link member 15. In the illustrated embodiment, the link member 15 is an elongate beam-shaped member, but may take any suitable form. It will be understood that the synchronal link mechanism 20 is shown applied to a hydraulic brake apparatus, but the link mechanism can also be used in a cable operated brake as well.

The link member 15 is connected with a cam follower connection to the first brake arm 12 through the first brake arm point 18 on the left side. The link member 15 is also connected with a cam follower connection to the second brake arm 13 through the second brake arm point 19 on the right side and pivots around the link pivot 111, which is fixed to the ground body 14. Points 18, 19 may be any suitable contact point formed on the respective brake arm 12, 13, such as rounded protrusions, pins, studs, and the like, and each point may include a roller. Other types of connections may also be suitable for permitting the link member 15 and points 18, 19 to operate. For example, the points 18, 19 may structurally have a flat surface facing the link 15, and the link may have curved surfaces that contact the point flat surfaces. The first brake arm point 18 and the second brake arm point 19 may thus be any suitable structure that is shaped and sized to engage or interact with the link member 15. The synchronal link mechanism 20 may be considered to include the link member 15, the first and second brake arm points 18, 19 and the link pivot 111.

The link member 15 is positioned to ride atop both the first brake arm point 18 and the second brake arm point 19 in a fashion that resembles a rocker arm. In other words, generally the tops of the points 18, 19 are both contacted or received by the link member 15 on an undersurface 28 of the link member, wherein the points are rounded and the undersurface is flat ("under" referring to the lower surface with the brake mounted in a typical fashion to a bicycle and as depicted in the figures). The cooperating surfaces of the points 18, 19 and link member 15 may be other suitable shapes. In the illustrated embodiment, flat surfaces 24, 26 are spaced apart surfaces, adjacent respective ends of the link member 15 and ride upon respective points 18, 19.

It will be noted that the link member 15 is not directly connected to or in contact with the spring 17, and functions to interconnect the motion of the first and second brake arms 12, 13 through points 18, 19. In this manner, the link member 15 need only deal with asymmetrical motion of the arms, and does not need to also accommodate the spring in either structure or strength.

The distances between the first brake arm point 18, the link pivot 111 and the second brake arm point 19 synchronize the first brake arm 12 with the second brake arm 13 such that both arms have the same or nearly the same angular velocity when operated.

The link member 15 pivots on the link pivot 111, which is fixed to the ground body 14, and moves in response to a force from the second arm point 19. Also, the spring 17 receives a higher force from the bracket 117 and the deflection energy of the spring increases during the closing process.

The present brake system divides the side loads in symmetric and asymmetric side loads. All symmetric loads at the pads take the side load path between the first brake arm 12 over piston 16 and to the second brake arm 13. All asymmetric loads take the side load path between the first brake arm 12 over synchronal link member 15 to the second brake arm 13. Normally, the asymmetric load is only caused by the spring 17 and differences in the friction in each connection and for this reason the asymmetric load is very low and the asymmetric side load path over the synchronal link member 15 does not require high strength components.

If the pressure in the hydraulic system decreases because the load on the master cylinder decreases, the deflection energy of the spring 17 helps to return both brake pads 116 to the outer end positions. The asymmetric spring load takes the side load path over the synchronal link member 15 to the second brake arm and permits both arms to open outwardly in a synchronous manner.

Loosening the screw 110 causes a loosening of the friction clamp between the ground body 14 and the pivot 11. When the ground body 14 is loosened with respect to the pivot 11, the center bolt 31 continues to retain the pivot to the bicycle frame 7. Loosening the ground body 14 permits the structure attached directly or indirectly thereto, e.g., the link mechanism 20 and brake arms 12, 13 and spring 17, to rotate together, as a unit about the pivot 11 without changing the relative positions of the structure attached thereto. Thus, an angular adjustment of the pads may be made without changing the distance between the brake pads and without changing spacing of the brake arms 12, 13, or the functioning of the link. If the screw 110 is loose, the ground body 14 can be turned around the pivot 11, which carries the pivot of the synchronal link member 15. This feature allows the user to center the brake without loosening the pivot 11 from the frame or the fork. Quick, easy and accurate centering adjustments of the single pivot brake mechanism 10 may be made in this manner.

Figure 8:
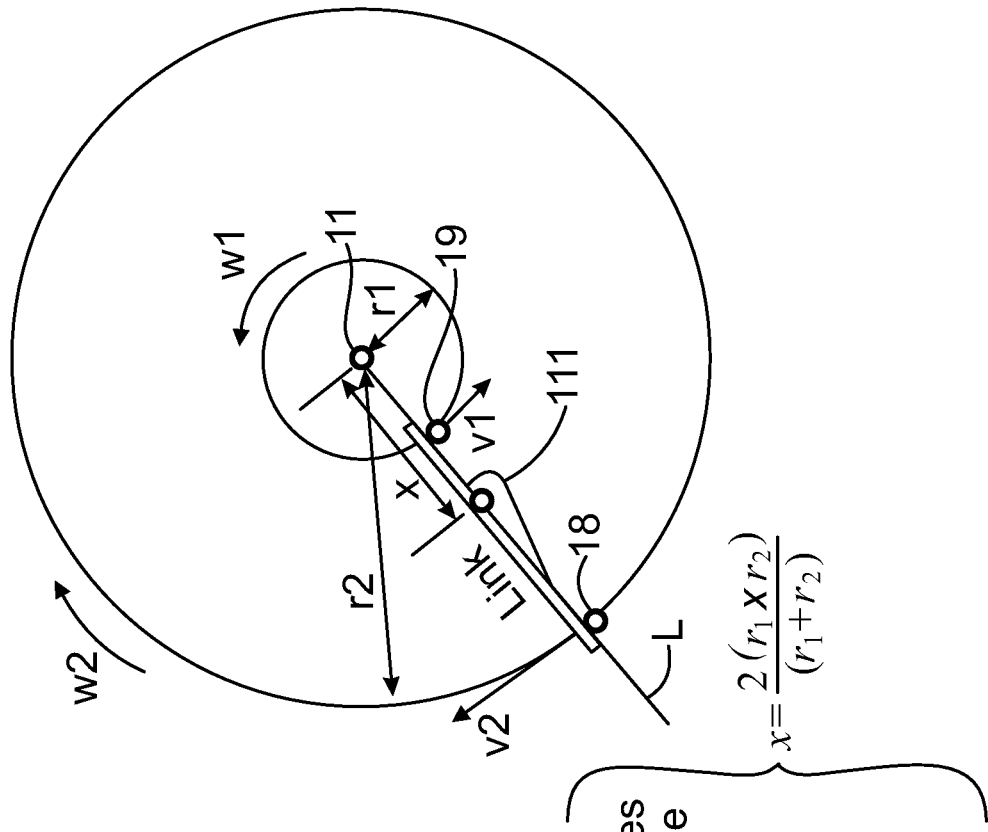
FIG. 8 is a diagrammatic illustration of the synchronous link and an example of how to calculate the distances between the various parts of the link system in order to ensure that both brake arms move synchronously.

FIG. 8 shows one method to determine the arrangement of parts of the synchronous link mechanism 20. The points 18, 19 and stud 111 are positioned such that the angular velocities of each of the first arm and second arm points 18, 19 are the same or about the same. In one embodiment, all four points (11, 18, 19, and 111) of the synchronal link mechanism 20 may be arranged to be aligned when the brake is positioned halfway between the minimal and maximal position of the caliper. The alignment is shown in FIG. 8 as line L, which passes through the center of pivot 11 and stud 111 and at points 18, 19 where contact is made with link 15. In this manner, motion in both directions causes nearly synchronous motion over the range of the caliper.

One configuration of points 18, 19 and stud 111 and the calculation of the positions thereof is shown. It is assumed that it is desirable to have the values of both angular velocities of points 18, 19 to be the same and this will yield a similar relative movement of the brake arms 12, 13. Thus: $\omega_1 = \omega_2$. So, from the figure, $r_1$ is the distance of point 19 of the second brake arm 13 measured from the center of the pivot 11. Similarly, $r_2$ is the distance of the point 18 of the first arm 12 measured from the center of the pivot 11. In order to determine the distance of the link pivot 111 "x" from the pivot 11, the following is employed:

$$x = \frac{2(r_1 \times r_2)}{(r_1 + r_2)}$$

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A brake assembly for a bicycle, comprising:
a first brake arm and a second brake arm pivotally disposed on only a single pivot;
a ground body disposed on the single pivot and releasably securable thereto, the ground body including a link pivot;
a link member pivotally disposed on the link pivot, the link member having a first end contacting the first brake arm and a second end contacting the second brake arm and arranged so as to synchronize the motion of the first brake arm and the second brake arm; and
a spring bearing directly against one or both of the first and second brake arms and biasing the first and second brake arms into a rest position.

2. The brake assembly for a bicycle of claim 1, wherein each of the first and second brake arms includes a brake arm point and the link member first end contacts the brake arm point of the first brake arm and the link member second end contacts the brake arm point of the second brake arm.

3. The brake assembly of claim 2, wherein the link member contacts each brake arm point on an undersurface of the link member.

4. The brake assembly of claim 2, wherein each brake arm point includes a roller.

5. The brake assembly of claim 3, wherein the link member includes a pair of spaced contacts on the undersurface for contacting the brake arm points.

6. The brake assembly of claim 5, wherein both of the pair of spaced contacts is generally flat.

7. The brake assembly of claim 1, wherein the link pivot is a cylindrical pin.

8. The brake assembly of claim 1, wherein the spring includes a first end that is fixed relative to the ground body.

9. The brake assembly of claim 8, wherein the spring includes a second end that is biased against the one of the first and second brake arms.

10. The brake assembly of claim 9, wherein the spring second end is slidably received in a bracket disposed on the one of the first and second brake arms.

11. The brake assembly of claim 1, wherein the brake assembly is a hydraulic brake.

12. A hydraulic rim brake for a bicycle, the bicycle including a master cylinder, the hydraulic rim brake comprising:
a first brake arm;
a second brake arm, the first and second brake arms pivotally connected to the bicycle; and
a slave cylinder non-rotatably disposed in one of the first and second brake arms and in fluid communication with the master cylinder, the slave cylinder including a piston positioned in the one of the first and second brake arms to act directly upon the other of the first and second brake arms, such that movement of the piston in response to fluid displacement in the master cylinder causes the first brake arm and the second brake arm to pivot.

13. The hydraulic rim brake of claim 12, including only a single pivot fixed to the bicycle, wherein the first and second brake arms are pivotally disposed on the single pivot.

14. The hydraulic rim brake of claim 12, wherein the piston has a cam follower connection to the other of the first and second brake arms.

15. The hydraulic rim brake of claim 14, wherein the other of the first and second brake arms includes a curved surface positioned to contactingly cooperate with the piston.

16. The hydraulic rim brake of claim 12, further including a single pivot fixed relative to the bicycle;
the first brake arm and the second brake arm pivotally disposed on the single pivot, each brake arm respectively including a brake arm point;
a ground body disposed on the single pivot and releasably securable thereto, the ground body including a link pivot;
a link member pivotally disposed on the link pivot, the link member having a first end contacting the first brake arm and a second end contacting the second brake arm and arranged so as to synchronize the motion of the first brake arm and the second brake arm; and
a spring biasing the first and second brake arms into a rest position.

17. The hydraulic rim brake of claim 16, wherein the link pivot is a cylindrical pin.

18. The hydraulic rim brake of claim 16, wherein the spring includes a first end that is fixed relative to the ground body.

19. The hydraulic rim brake of claim 18, wherein the spring includes a second end that is biased against the one of the first and second brake arms.

20. The hydraulic rim brake of claim 19, wherein the spring second end is biased against the other of the first and second brake arms.

21. The hydraulic rim brake of claim 19, wherein the spring second end is slidably received in a bracket on the other of the first and second brake arms.

22. The hydraulic rim brake of claim 16, wherein the link member contacts each brake arm point on an undersurface of the link member.

23. The hydraulic rim brake of claim 22, wherein the link member includes a pair of spaced contacts on the undersurface, each of the pair of spaced contacts contacting a respective brake arm point.

24. The hydraulic rim brake of claim 23, wherein both of the pair of spaced contacts is flat.

25. The hydraulic rim brake of claim 12, wherein the slave cylinder and the master cylinder are parts of a closed hydraulic system.

26. A brake assembly for a bicycle, comprising:
a first brake arm and a second brake arm pivotally disposed only on a single pivot;
an adjustable ground body disposed on the single pivot and releasably securable thereto in a plurality of positions, the ground body including a link pivot, wherein the ground body is movable about the single pivot with the single pivot fixed to the bicycle;
a synchronous link mechanism including a link member pivotally disposed on the link pivot and interconnecting the ground body and the first and second brake arms and arranged so as to synchronize the motion of the first and second brake arms; and
a spring biasing the first and second brake arms into a rest position.

27. The brake assembly of claim 26, wherein the single pivot is fixed to the bicycle with a center nut.

28. The brake assembly of claim 27, wherein the ground body is spaced from the bicycle by the center nut.

29. The brake assembly of claim 27, wherein the ground body, the synchronous link mechanism, the first and second brake arms, and the spring are positioned outboard of the center nut relative to the bicycle.

30. The brake assembly of claim 26, wherein the ground body is movable about the single pivot with the single pivot fixed to the bicycle.

31. The brake assembly of claim 26, wherein the ground body, the synchronous link mechanism, the first and second brake arms, and the spring are all rotatable as a unit when the ground body is unsecured from the single pivot.

32. The brake assembly of claim 26, wherein the ground body is releasably clampable about the single pivot.

33. The brake assembly of claim 32, wherein the ground body is releasably clampable about the single pivot with a clamping screw.

34. The brake assembly of claim 33, wherein the clamping screw passes through the ground body.

35. The brake assembly of claim 26, wherein the brake assembly is a hydraulic brake.

36. The brake assembly of claim 26, wherein the spring includes a first end that is fixed relative to the ground body.

37. The brake assembly of claim 36, wherein the spring includes a second end that is biased against the one of the first and second brake arms.

38. The brake assembly of claim 37, wherein the spring second end is slidably received in a bracket disposed on the one of the first and second brake arms.

* * * * *